Apr. 10, 1923.
E. M. ROSENBLUTH
SIGNALING DEVICE
Filed July 28, 1921
1,451,345
2 sheets-sheet 1
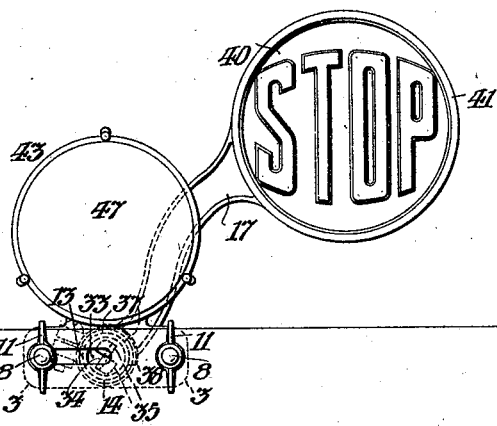
FIG. I.
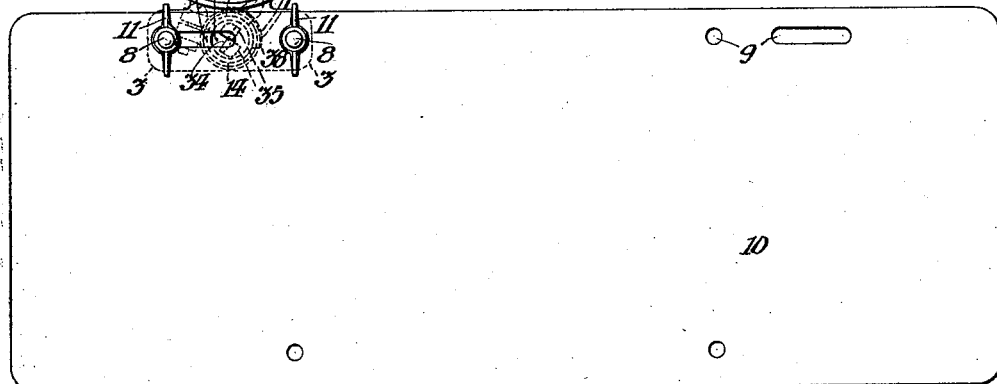
FIG. II.
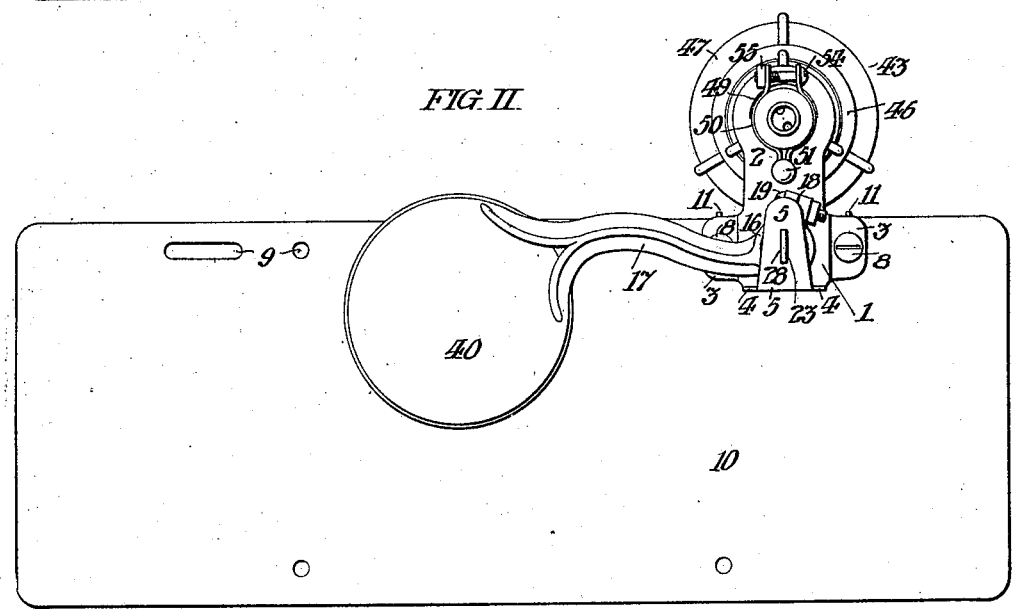
INVENTOR:
EDWIN M. ROSENBLUTH, Apr. 10, 1923.
E. M. ROSENBLUTH
1,451,345
SIGNALING DEVICE
Filed July 28, 1921
2 sheets-sheet 2
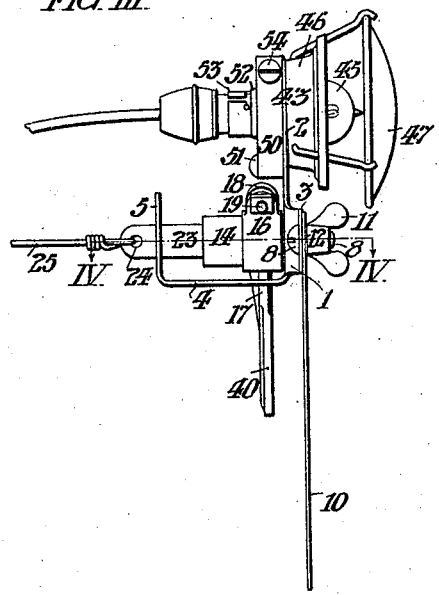
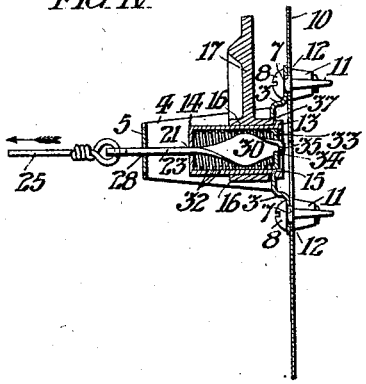
INVENTOR:
EDWIN M. ROSENBLUTH Patented Apr. 10, 1923.

1,451,345

UNITED STATES PATENT OFFICE.

EDWIN M. ROSENBLUTH, OF WALLINGFORD, PENNSYLVANIA.

SIGNALING DEVICE.

Application filed July 28, 1921. Serial No. 488,071.

*To all whom it may concern:*

Be it known that I, EDWIN M. ROSENBLUTH, a citizen of the United States, residing at Wallingford, in the county of Delaware and State of Pennsylvania, have invented a certain new and useful Improvement in Signaling Devices, whereof the following is a specification, reference being had to the accompanying drawing.

My invention is particularly applicable to vehicles, such as automobiles, to automatically manifest a signal when the vehicle is about to stop, by the cooperative relation of the signaling device with the brake mechanism of such a vehicle, or other part of the vehicle structure which must be moved to stop the vehicle.

As hereinafter described, my invention is conveniently embodied in an organization including a frame member adapted to detachably support a vehicle license number plate, a lamp in position to illuminate the numbered face of said plate, a semaphore pivotally supported in such relation to said plate as to be normally concealed behind the latter, and means adapted to raise said semaphore above said plate and into position to be illuminated by said lamp; such raising means including a screw member which is axially movable in the hub of said semaphore; the thread of said screw member being of such rapid pitch as to turn said semaphore when said screw is moved axially in said frame without turning said screw; such axial movement being conveniently effected by a flexible connector extending from said screw to the movable member of the vehicle structure selected to automatically operate the signaling device, as above contemplated.

My invention includes the various novel features of construction and arrangement hereinafter more definitely specified.

In said drawing; Fig. I is a front elevation of a convenient embodiment of my invention including a single frame carrying a semaphore and a lamp and license plate in cooperative relation therewith.

Fig. II is a rear elevation of the structure shown in Fig. I.

Fig. III is a side elevation of said structure.

Fig. IV is a fragmentary plan sectional view taken on the line IV, IV in Fig. III.

In said figures; 1 is a frame conveniently formed of a single piece of primarily flat sheet metal pressed to the form shown and including the main vertical web 2 having the offset side lugs 3, horizontal bracket web 4 and vertical bracket web flange 5. Said lugs 3 have holes 7 for bolts 8 which extend through corresponding holes 9 in the license number plate 10 in engagement with wing nuts 11 which bear upon washers 12 and hold said number plate in rigid relation with said frame 1.

As best shown in Fig. IV; said lugs 3 on the bracket 1 hold said number plate 10 in such spaced relation with the main web 2 of said frame as to afford clearance for the annular flange 13 on the nut sleeve 14 which latter extends through the opening 15 in said bracket web 2 and is retained in rotatable relation therewith by the hub 16 of the semaphore 17; said hub being slit at 18 and provided with the clamp screw 19 whereby said semaphore may be clamped in proper angular relation on said nut sleeve 14.

Said nut 14 is slotted at 21 to form what is in fact a screw thread of rapid pitch, through which extends the screw bar 23 having the hole 24 at its outer end for engagement with the flexible connector 25 which extends to the brake lever 26 or other movable member of the automobile structure selected to operate the signaling device. Said screw bar 23 extends through the straight vertical slot 28 in the bracket web 5 so that it may be reciprocated in axial relation with said nut sleeve 14, without turning in said frame 1. As best shown in Fig. IV, said screw bar 23 is twisted within said nut sleeve 14 so as to form a screw thread 30 of rapid pitch, which when drawn through said nut slot 21, in the direction of the arrow shown in Fig. IV, causes said sleeve to turn and lift said semaphore from its lower position shown in Fig. II to its upper position shown in Fig. I. However, said screw bar 23 is normally held in the position shown in Fig. IV, to maintain said semaphore in the lowered position shown in Fig. II, by the spring 32 which encircles said bar 23 within said nut sleeve 14 and abuts against the washer 33 which has a straight vertical slot 34 to receive the end of said screw bar 23 and is held thereon by the lugs 35 which are formed by bifurcating said bar and bending the bifurcations in opposite directions, at right angles to the plane of said bar.

The arcual movement of said semaphore is limited and the axial movement of said screw bar consequently limited, by the stop lug 37 on said semaphore hub 16 extending in the arcual slot 38 in said bracket web 2. As indicated in dotted lines in Fig. I, said slot 38 is a sector concentric with the axis of said nut sleeve 14 and extending somewhat more than a quarter of a circle.

I prefer to make the semaphore of a single casting having the circular target 40 recessed to leave the circular rim 41 and letters "STOP" in relief so that the recessed portions of said target may be filled with enamel or paint of a color contrasting with said letters. For instance, said target may be of aluminum and filled with red enamel; the surface of said letters being polished to reflect the light from the lamp fixture 43 when said semaphore is raised to the position shown in Fig. I.

Said lamp structure 43 is preferably of the general type shown in Letters Patent of the United States No. 1,275,758, granted to me August 13, 1918 and including the electric incandescent bulb 45, detachably mounted in the casing 46 behind the translucent panel 47 which is preferably of colored glass forming a Fresnel lens. Said casing 46 extends through the opening 49 in said bracket web 2 and is conveniently detachably secured in rigid relation with the latter by the clamping band 50 which is secured to said bracket web 2 by the rivet 51 and arranged to embrace the split tubular extension 52 of said casing and constricted thereon so as to also clamp the lamp socket 53 by the bolt 54 and nut 55 best shown in Fig. II; such clamping means being claimed in Letters Patent of the United States No. 1,224,097 granted to me April 24, 1917.

Although said translucent panel 47 of the lamp structure is adapted to project light from the lamp 45 in a beam extending axially with respect to the lamp socket 53 and thus afford a red rear signal; said panel is in spaced relation with said casing as best shown in Fig. III, to permit the light to be projected laterally from said lamp 45 to illuminate both the license number plate 10 and the semaphore target 40 when they are in the cooperative relation shown in Fig. I.

However, I do not desire to limit myself to the precise details of construction and arrangement herein set forth, as it is obvious that various modifications may be made therein without departing from the essential features of my invention, as defined in the appended claims.

I claim:

1. In a signaling device, the combination with a frame member adapted to detachably support a vehicle license number plate; of a lamp having means detachably connecting it with said frame member in position to illuminate the numbered face of said plate; a hollow nut sleeve journaled in said frame; a semaphore signal carried by said nut sleeve in such relation to said plate as to be normally concealed behind the latter; means adjustably connecting said nut sleeve and semaphore including a bifurcated clamp on the latter; means adapted to raise said semaphore above said plate and into position to be illuminated by said lamp; including a screw member axially movable in said nut sleeve as a nut, and having thread of such rapid pitch as to turn said semaphore when said screw is moved axially in said frame and nut sleeve without turning said screw; means limiting the turning movement of said semaphore, including a stop projection extending therefrom in an arcual slot in said frame member; an abutment on said screw; a spring encircling said screw within said nut sleeve, and bearing at one end upon said abutment; whereby said screw is normally shifted to one extreme of its axial movement; and a connecter extending from said screw to a member of a vehicle which it is necessary to move to stop the vehicle; whereby said semaphore signal is automatically displayed as a consequence of the movement of said vehicle member.

2. In a signaling device, the combination with a frame member adapted to detachably support a vehicle license number plate; of a lamp having means detachably connecting it with said frame member in position to illuminate the numbered face of said plate; a hollow nut sleeve journaled in said frame; a semaphore signal carried by said nut sleeve in such relation to said plate as to be normally concealed behind the latter; means angularly adjustably connecting said nut sleeve and semaphore; means adapted to raise said semaphore above said plate and into position to be illuminated by said lamp; including a screw member axially movable in said nut sleeve as a nut, and having thread of such rapid pitch as to turn said semaphore when said screw is moved axially in said frame and nut sleeve without turning said screw; means limiting the turning movement of said semaphore, including a stop projection extending therefrom and adapted to engage said frame member; a spring encircling said screw, whereby said screw is normally shifted to one extreme of its axial movement; and means connecting said screw with a member of a vehicle which it is necessary to move to stop the vehicle; whereby said semaphore signal is automatically displayed as a consequence of the movement of said vehicle member.

3. In a signaling device, the combination with a frame member adapted to detachably support a vehicle license number plate; of a lamp having means detachably connecting it with said frame member in position to illuminate the numbered face of said plate;

a hollow nut sleeve journaled in said frame; a semaphore signal carried by said nut sleeve in such relation to said plate as to be normally concealed behind the latter; means adjustably connecting said nut sleeve and semaphore; means adapted to raise said semaphore above said plate and into position to be illuminated by said lamp; including a screw member axially movable in said nut sleeve as a nut, and having thread of such rapid pitch as to turn said semaphore when said screw is moved axially in said nut sleeve without turning said screw; means limiting the turning movement of said semaphore; a spring, whereby said crew is normally shifted to one extreme of its axial movement; and means connecting said screw with a member of a vehicle which it is necessary to move to stop the vehicle; whereby said semaphore signal is automatically displayed as a consequence of the movement of said vehicle member.

4. In a signaling device, the combination with a frame member adapted to detachably support a vehicle license number plate; of a lamp having means detachably connecting it with said frame member in position to illuminate the numbered face of said plate; a hollow nut sleeve journaled in said frame; a semaphore signal carried by said nut sleeve in such relation to said plate as to be normally concealed behind the latter; means adjustably connecting said nut sleeve and semaphore including a bifurcated clamp on the latter; means adapted to raise said semaphore above said plate and into position to be illuminated by said lamp; including a screw member axially movable in said nut sleeve as a nut, and having thread of such rapid pitch as to turn said semaphore when said screw is moved axially in said frame and nut sleeve without turning said screw; means limiting the turning movement of said semaphore, including a stop projection extending therefrom in an arcual slot in said frame member; an abutment on said screw; and a spring encircling said screw within said nut sleeve, and bearing at one end upon said abutment; whereby said screw is normally shifted to one extreme of its axial movement.

5. In a signaling device, the combination with a frame member adapted to detachably support a vehicle license number plate; of a lamp having means detachably connecting it with said frame member in position to illuminate the numbered face of said plate; a hollow nut sleeve journaled in said frame; a semaphore signal carried by said nut sleeve in such relation to said plate as to be normally concealed behind the latter; means angularly adjustably connecting said nut sleeve and semaphore; means adapted to raise said semaphore above said plate and into position to be illuminated by said lamp; including a screw member axially movable in said nut sleeve as a nut, and having thread of such rapid pitch as to turn said semaphore when said screw is moved axially in said frame and nut sleeve without turning said screw; means limiting the turning movement of said semaphore, including a stop projection extending therefrom and adapted to engage said frame member; and a spring encircling said screw, whereby said screw is normally shifted to one extreme of its axial movement.

6. In a signaling device, the combination with a frame member adapted to detachably support a vehicle license number plate; of a lamp having means detachably connecting it with said frame member in position to illuminate the numbered face of said plate; a hollow nut sleeve journaled in said frame; a semaphore signal carried by said nut sleeve in such relation to said plate as to be normally concealed behind the latter; means adjustably connecting said nut sleeve and semaphore; means adapted to raise said semaphore above said plate and into position to be illuminated by said lamp; including a screw member axially movable in said nut sleeve as a nut, and having thread of such rapid pitch as to turn said semaphore when said screw is moved axially in said nut sleeve without turning said screw; means limiting the turning movement of said semaphore; and a spring, whereby said screw is normally shifted to one extreme of its axial movement.

7. In a signaling device, the combination with a frame member; of a nut journaled in said frame; a semaphore signal carried by said nut; means angularly adjustably connecting said nut and semaphore including a bifurcated clamp on the latter; means adapted to operate said semaphore, including a screw member axially movable in said nut and having thread of such rapid pitch as to turn said semaphore when said screw is thus moved, without turning said screw; means limiting the turning movement of said semaphore, including a stop projection extending therefrom in an arcual slot in said frame member; an abutment washer on said screw, held by the bent end of said screw; a spring encircling said screw within said nut and bearing at one end upon said abutment; whereby said screw is normally shifted to one extreme of its axial movement; and a connector extending from said screw to a member of a vehicle which it is necessary to move to stop the vehicle; whereby said semaphore signal is automatically displayed as a consequence of the movement of said vehicle member.

8. In a signaling device, the combination with a frame member; of a nut journaled in said frame; a semaphore signal carried by said nut; means angularly adjustably connecting said nut and semaphore; means adapted to operate said semaphore, including a screw member axially movable in said nut and having thread of such rapid pitch as to turn said semaphore when said screw is thus moved, without turning said screw; means limiting the turning movement of said semaphore, including a stop projection extending therefrom in an arcual slot in said frame member; an abutment washer on said screw, held by the bent end of said screw; a spring encircling said screw within said nut, and bearing at one end upon said abutment; whereby said screw is normally shifted to one extreme of its axial movement; and a connector extending from said screw to a member of a vehicle which it is necessary to move to stop the vehicle; whereby said semaphore signal is automatically displayed as a consequence of the movement of said vehicle member.

9. In a signaling device, the combination with a frame member; of a nut journaled in said frame; a semaphore signal carried by said nut; means angularly adjustably connecting said nut and semaphore including a bifurcated clamp on the latter; means adapted to operate said semaphore, including a screw member axially movable in said nut and having thread of such rapid pitch as to turn said semaphore when said screw is thus moved, without turning said screw; means limiting the turning movement of said semaphore; an abutment washer on said screw, held by the bent end of said screw; a spring encircling said screw within said nut and bearing at one end upon said abutment; whereby said screw is normally shifted to one extreme of its axial movement; and a connector extending from said screw to a member of a vehicle which it is necessary to move to stop the vehicle; whereby said semaphore signal is automatically displayed as a consequence of the movement of said vehicle member.

10. In a signaling device, the combination with a frame member; of a nut journaled in said frame; a semaphore signal carried by said nut; means angularly adjustably connecting said nut and semaphore; means adapted to operate said semaphore, including a screw member axially movable in said nut and having thread of such rapid pitch as to turn said semaphore when said screw is thus moved, without turning said screw; means limiting the turning movement of said semaphore; an abutment washer on said screw, held by the bent end of said screw; a spring encircling said screw within said nut and bearing at one end upon said abutment; whereby said screw is normally shifted to one extreme of its axial movement; and a connector extended from said screw to a member of a vehicle which it is necessary to move to stop the vehicle; whereby said semaphore signal is automatically displayed as a consequence of the movement of said vehicle member.

11. In a signaling device, the combination with a frame member; of a nut journaled in said frame; a semaphore signal carried by said nut; means angularly adjustably connecting said nut and semaphore; means adapted to operate said semaphore, including a screw member axially movable in said nut and having thread of such rapid pitch as to turn said semaphore when said screw is thus moved, without turning said screw; means limiting the turning movement of said semaphore, including a stop projection extending therefrom in an arcual slot in said frame member; an abutment washer on said screw, held by the bent end of said screw; and a spring encircling said screw within said nut, and bearing at one end upon said abutment; whereby said screw is normally shifted to one extreme of its axial movement.

12. In a signaling device, the combination with a frame member; of a nut journaled in said frame; a semaphore signal carried by said nut; means angularly adjustably connecting said nut and semaphore including a bifurcated clamp on the latter; means adapted to operate said semaphore, including a screw member axially movable in said nut and having thread of such rapid pitch as to turn said semaphore when said screw is thus moved, without turning said screw; means limiting the turning movement of said semaphore; an abutment washer on said screw, held by the bent end of said screws; and a spring encircling said screw within said nut and bearing at one end upon said abutment; whereby said screw is normally shifted to one extreme of its axial movement.

13. In a signaling device, the combination with a frame member; of a nut journaled in said frame; a semaphore signal carried by said nut; means angularly adjustably connecting said nut and semaphore; means adapted to operate said semaphore, including a screw member axially movable in said nut and having thread of such rapid pitch as to turn said semaphore when said screw is thus moved, without turning said screw; means limiting the turning movement of said semaphore; an abutment washer on said screw, held by the bent end of said screw; and a spring encircling said screw within said nut and bearing at one end upon said abutment; whereby said screw is normally shifted to one extreme of its axial movement.

14. In a signaling device, the combination with a frame member; of a nut journaled in said frame; a semaphore signal carried by said nut; means angularly adjustably connecting said nut and semaphore; means adapted to operate said semaphore, including a screw member axially movable in said nut and having thread of such rapid pitch as to turn said semaphore when said screw is thus moved, without turning said screw; means limiting the turning movement of said semaphore; an abutment washer on said screw, held by the bent end of said screw; and a spring whereby said screw is normally shifted to one extreme of its axial movement.

In testimony whereof, I have hereunto signed my name at Philadelphia, Pennsylvania, this 25th day of July, 1921.

EDWIN M. ROSENBLUTH.

Witnesses:
M. G. McHugh,
H. C. Rosenbluth.